(No Model.)
J. CONWAY.
NUT LOCK.
No. 336,037. Patented Feb. 9, 1886.
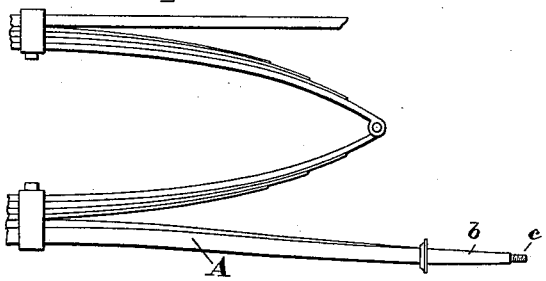
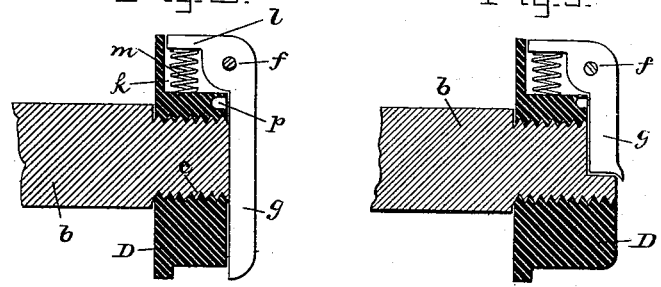
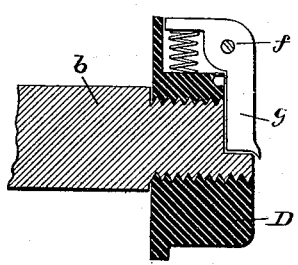
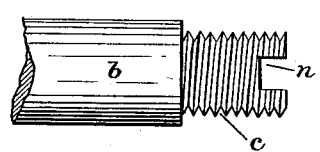
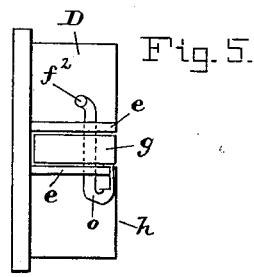
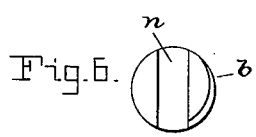
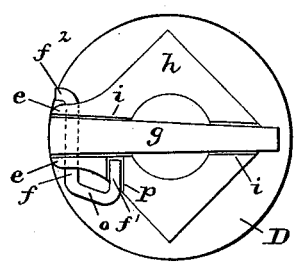
Witnesses
G. F. Boyden.
John E. Morris.
Inventor:
Jesse Conway
By Attorney
Chas. B. Mann

UNITED STATES PATENT OFFICE.

JESSE CONWAY, OF BALTIMORE, MARYLAND, ASSIGNOR OF TWO-THIRDS TO JOHN N. CONWAY AND JOHN S. BULLOCK, BOTH OF SAME PLACE.

NUT-LOCK.

SPECIFICATION forming part of Letters Patent No. 336,037, dated February 9, 1886.

Application filed November 27, 1885. Serial No. 184,038. (No model.)

*To all whom it may concern:*

Be it known that I, JESSE CONWAY, a citizen of the United States, residing at Baltimore, in the State of Maryland, have invented certain new and useful Improvements in Vehicle-Axle Nut-Locks, of which the following is a specification.

My invention relates to a vehicle-axle nut-lock, and will be described in connection with the annexed drawings, in which—

Figure 1 is a view of a vehicle-axle of the kind to which my improved nut is applied. Fig. 2 is a section of an axle-arm and the improved nut. Fig. 3 is a like view showing a modification. Fig. 4 is a side view of the axle-arm, showing the notch at the end thereof. Fig. 5 is a side view of the improved nut. Figs. 6 and 7 are end views of the axle-arm. Fig. 8 is a front view of the nut.

The axle A has the arm $b$, on which the hub of the wheel turns. At the end of the axle-arm is the usual screw, $c$, and the wheel when on the arm is retained by the nut D. At one corner of the nut are two ears, $e$, through which passes a pin or bolt, $f$, whereby a dog, $g$, which occupies the space between the two ears, is pivoted. The front face, $h$, of the nut has a groove or slot, $i$, extending across it from the space between the two ears $e$, and the dog $g$, which is pivoted at one end between the ears, normally occupies this groove. As one end of the dog is pivoted, it will be understood the other end is free to move out of the groove and away from the front face. The nut has a recess, $k$, at the corner where the ears are, and the dog has a right-angled extension, $l$, at the pivoted end, which covers the recess in the nut. A suitable spring, $m$, occupies the said recess and bears upon the inner side of the right-angled extension of the dog, and serves to keep the dog pressed into the groove $i$ in the nut. The axle-arm $b$ has a notch, $n$, at the end, and the pivoted dog $g$ on the nut takes position in the said notch. Thus it will be seen that the nut is prevented from turning backward and accidentally coming off by the engagement of the pivoted dog with the notch. The spring $m$ keeps the dog in engagement with the notch.

In order to remove the nut, the free end of the pivoted dog $g$ must first be lifted out of the groove $i$, thereby disengaging it from the notch in the end of the axle.

By a peculiarity in the construction of the pivot-pin $f$ provision is made for holding the dog when its free end is lifted out of the groove in the front of the nut, for the purpose of keeping said free end from being pressed back into the groove, and keeping it disengaged from the notch $n$ at the end of the axle-arm, so as to permit the nut to be turned. The ends of the pivot-pin $f$ project beyond the ears, and one end is curved, as at $o$, and bent back, as at $f'$, toward the other end, and the bent-back part rests in a notch, $p$, in the front face of the nut. It will be seen the pin is long enough between the end $f^2$ and the curved part $o$ at the opposite end to allow it to slide endwise in the pivot-holes of the ears.

When the dog $g$ is lifted out of the groove $i$ far enough to be disengaged from the notch $n$, at the end of the axle-arm, it may be retained in said position by sliding the pivot-pin endwise until the bent-back part $f''$ takes under the dog.

It is not essential, as the modifications in Figs. 3 and 7 indicate, that the dog should extend entirely across the front face of the nut, nor that the notch in the end of the axle-arm should extend entirely across. It is sufficient if the dog pivoted on the nut engages with a notch, however small, on the end of the axle-arm. My invention therefore is not limited to the precise construction shown.

Having described my invention, I claim and desire to secure by Letters Patent of the United States—

1. A vehicle-axle having a notch at the end of its arm, in combination with a nut having a pivoted dog for engagement with said notch, as set forth.

2. A vehicle-axle having a notch at the end of its rim, in combination with a nut having a pivoted dog for engagement with said notch and a spring for keeping the dog in such engagement, as set forth.

3. The combination of an axle-arm having a notch at its end, a nut having a recess, $k$, a dog pivoted to the nut and having at one end a right-angled extension, $l$, which covers the recess, and a spring, m, in the recess bearing upon the said extension end, as set forth.

4. The combination of an axle-arm having a notch at its end, a nut, a dog, and a pin pivoting the dog to the nut and long enough to slide endwise in the pivot-hole, and provided at one end with a curved and bent-back part, f', to take under the dog, as set forth.

In testimony whereof I affix my signature in presence of two witnesses.

JESSE CONWAY.

Witnesses:
   JNO. T. MADDOX,
   JOHN E. MORRIS.